United States Patent Office 3,426,108
Patented Feb. 4, 1969

3,426,108
METHOD OF FABRICATING SHELL TYPE POLYSTYRENE ARTICLES
George C. Britten, Massapequa, N.Y., assignor to Ilikon Corporation, Natick, Mass., a corporation of Delaware
No Drawing. Filed May 28, 1965, Ser. No. 459,908
U.S. Cl. 264—21     9 Claims
Int. Cl. B29d 27/00; B29c 13/00

ABSTRACT OF THE DISCLOSURE

A method of fabricating shell type polystyrene articles in which pre-expanded polystyrene particles are electrostatically charged while they are contained in an air fluidized bed. The electrostatically charged particles are then brought in contact with a portion of the interior wall of a cavity mold, such as by dipping the center core of a cylindrical mold into the bed, to produce a uniform distribution of particles over the contacted surface of the mold. The mold is then assembled and heated thereby expanding the particles to substantially fill the portions of the cavity adjacent to those portions of the wall on which the particles have been adhered.

---

My invention relates to a method of fabricating shell type articles from plastic particles. In particular, my discovery concerns a method of charging polystyrene beads to a mold and forming thin wall polystyrene expanded articles such as containers, cups, jars and the like.

Expandable polystyrene beads may be expanded by the application of heat into a strong smooth-skinned foam article of desired form having densities of from 1 to 20 pounds per cubic foot. These beads can be charged directly into a mold and heated to form an expanded article. However, when articles of uniform density and/or low density are desired the beads are normally preliminarily subject to an unconfined pre-expansion to the desired density before charging to the mold.

In the fabrication of thin wall expanded polystyrene cups the beads are usually expanded by steam at 300–350° F. and the pre-expanded beads fed to a storage vessel. These pre-expanded beads are then blown or aspirated into the desired mold cavity with air. Each mold is commonly designed to accommodate a venturi air-aspirator gun or charging system which operates when the mold is closed. The pre-expanded beads are then heated by steam in the mold cavity to bring about further expansion and fusion together of the beads. The mold is then cooled commonly by the introduction of cold water before the mold is opened to prevent further or post expansion of the beads. Due to the insulating properties of the expanded polystyrene, this cooling operation takes longer with high density articles than with low density parts. The cooled expanded article is then ejected from the mold cavity and the cycle repeated.

This operation requires pre-expansion equipment and control of pre-expansion. Additionally the employment of a venturi charging system with each individual mold presents numerous operating and production difficulties. Individual venturi systems limit the production rate of the finished articles since a large number of venturi systems require a complex aspirating system and are subject to operating difficulties. The use of the larger pre-expanded polystyrene beads with venturi charging systems often creates production hold-ups due to the tendency of some of the beads to become lodged in and to block the venturi tube unless a preliminary screening and grading of the beads is conducted. Venturi charging systems also have the disadvantage of permitting a non-uniform fill of beads in the mold cavity. The beads often are blown into a mold with the beads having a greater density packed at the bottom or far end of the mold due to the packing effect and force of the blown beads. Non-uniform fill results in articles of non-uniform density.

It is therefore an object of my invention to provide a means of fabricating shell type plastic articles such as expanded polystyrene containers characterized by thin wall sections of uniform thickness and density.

It is an object of my invention to provide a means of electrostatically charging a uniform thickness of polystyrene beads into a mold cavity or onto a mold element such as a core.

It is also an object of my invention to provide a method of charging polystyrene beads to mold cavities whereby multiple cavity molds, and faster production rates and operating cycles are possible.

It is a further object of my invention to provide molds and cores containing insulated and non-insulating sections, which molds have particular utility in the practice of my inventive method.

Other objects and advantages of my discovery will be apparent to those skilled in the molding art from the following more detailed description and examples of my invention.

I have found that the objects of my invention are accomplished by forming a uniform thickness of polystyrene beads in the mold cavity through electrostatic attraction between the beads and the walls of the mold cavity, and subsequently heating the closed mold to form the finished article. My discovery permits the use of pre-expanded or unexpanded polystyrene beads and eliminates the difficulties associated with venturi charging of the beads to the mold cavity. In my invention the beads, all or a portion of the mold platen or mold cavity walls, or both may be electrically charged. For example, the beads may be electrically charged, and the mold cavity wall surfaces charged with electrical charges of the opposite sign. Further, the amount of the electrostatic charge may be varied so that the thickness of the beads carried into the mold cavity may be controlled.

In one embodiment for the fabrication of a thin walled tapered polystyrene cup, a fluidized bed of electrostatically charged polystyrene beads such as commercial beads sold as DYLITE beads, e.g., 20 to 250 mesh, is provided by placing a quantity of polystyrene beads, e.g., to a depth of 1 to 2 feet in an insulated container. This container has a porous bottom surface through which a fluid such as a gas like nitrogen, steam, carbon dioxide, wet or dry air, or the like, is directed upwardly to form a fluidized bed of beads. In one example, dry air is introduced upwardly at a desired pressure and flow rate depending upon the size and density of beads to form an air fluidized bed of polystyrene beads in the container. The container is provided with an inner bottom surface further characterized by a plurality of evenly spaced metal electrode buttons or probes in electrical communication with a charge generating source or system.

One system is a direct current generator in electrical communication with the buttons through a capacitor which permits charged storage and discharge to the metal buttons. The electrode buttons in the container place an electrostatic positive or negative charge on the surface of the fluidized insulated polystyrene beads. The charge applied should be sufficient, e.g., 500 to 1000 e.s.u. so that the beads will cling to the mold platen or core and preferably so that shaking or normal production handling of the mold platen or core will not readily dislodge the beads therefrom. The beads may of course be eletcrostatically charged by direct contact or by induction, or by any other means.

The mold to fabricate a thin walled tapered tubular cup comprises a pair of outer metal mold platens which in a closed position fit together in mating engagement about an inner tubular shaped metal core or mandrel to form an inner mold cavity of the desired shape. A typical means of carrying out my invention is to dip the mold core into the bed of fluidized polystyrene beads whereby the core will immediately become uniformly coated with a layer of beads firmly adhered by electrostatic attraction to the core surface. The charge on the surface of the polystyrene beads induces an opposite charge on the mold core and a uniform layer of beads is rapidly deposited over the surface of the core.

The thickness of the coating on the core will be related to the charge potential and the weight of the beads. For example, the formation of an article having a thick wall section with a high density bead would require a higher charge. In other situations, it may be desirable to charge the core surface with an opposite charge before contacting the beads in the bed particularly where a thick layer of beads is required. The core with the layer of beads is then transferred between the mold platens and the mold closed. The closed mold is then heated to expand and fuse the beads into a cup container. The mold may be heated by steam directly injected into the mold cavity, by a steam probe in the mold cavity, by the use of a perforated mold within a steam chest or autoclave, by electrical resistance heating, by radio frequency heating or any other means. As the beads are expanded, partially melted and fused, the adhering electrostatic charge is dissipated. The beads on partial fusion form a self supporting structure in close proximity to the walls of the mold cavity, so that thin walled articles of very uniform density and wall thickness are provided. After expansion and fusion the mold is then cooled and the finished cup ejected.

In the method described the inner mold core contacted the charged beads, but in some situations it may be more desirable to dip the outer mold platens or both the platens and the core into the charged beads or where no inner core is employed to dip one or more mold platens. To prevent the charged beads from indiscriminately forming a layer over the entire contacting surface of the mold or core a thin layer of insulating material such as an electrically insulating plastic or other material like Teflon, a fluorocarbon resin may be coated onto certain portions of the mold surfaces. In the typical example given the outer mold platens may have that portion of the mold surfaces which do not form a portion of the mold cavity coated with Teflon to prevent the charged polystyrene beads from adhering to the inner surface of the mold and preventing close contact of the mold surfaces in the closed position. For example, the contacting metal surfaces of the mold platens in a closed position may be coated, sprayed, dipped or otherwise covered with a thin film of insulating material.

By the use of electrically insulating coatings on the interior of the mold cavity, articles having selectively thin sections may be formed. For example, rather than preventing adhesion of the electrostatically charged beads a thin insulating film can be used in desired areas of the mold cavity walls to reduce the tendency of the beads to adhere in that area. Thus even though the entire mold is uniformly charged, a thinner film of beads will adhere on the insulated section due to the decrease in charge density in this insulated area. It is possible by this method and mold to make lace-type and honeycomb plastic structures by properly undercutting the mold and applying an insulating coating. These structures have utility as high strength honeycomb structrues for mechanical support function, e.g., aircraft wings and for home insulation.

By my discovery large shell type articles may be formed of uniform thickness, since the size of the mold platen and fluidized bed are the only limiting factors. Elimination of venturi system permits large mold platens having a plurality of mold cavities to be profitably used with a corresponding increase in production rate and capital cost and a decrease in production troubles due to stoppage, and non-uniform density and thickness of the finished article.

In a further embodiment of my invention a metered or measured amount of precharged polystyrene beads such as pre-expanded beads are charged into a mold cavity by any convenient means. The beads are precharged, that is, have a surface electrostatic charge of a predetermined sign and potential before introduction into the mold. An electrical or electrostatic field is then set up about and around the outside of the closed metal mold. This may be accomplished by an arcuate conductor bar spaced from and about the mold which bar is connected to a direct current generator. Passage of the current through the bar induces a charge of the opposite sign over the mold surface and mold cavity walls. The induced charge should be opposite in sign to that of the charge on the polystyrene beads. The closed mold is then rotated about one axis to distribute the precharged beads evenly over the oppositely charged walls of the mold cavity surface whereby the beads uniformly adhere and form a coating on the inner mold cavity wall. The closed mold is then heated to expand and fuse the beads, cooled and the finished article ejected.

My invention has been particularly described with polystyrene beads. However, my method may be employed in charging any light electrically non-conductive or particularly plastic particles, solid or hollow, into a mold cavity. For example, a fluidized bed of any insulating material capable of holding an electrostatic charge on its surface may be used, such as particles of thermoplastic or thermosetting natural or synthetic plastics, resins or polymers capable of being pressed or fused or both in a mold cavity to the desired shape. Typical particles which may be used include vinyl resins like vinyl chloride such as polyvinylchlorides, copolymers of viny lacetate and vinyl chloride, polystyrene expandable and non-expandable, polyolefins like polyethylene, polypropylene, elastomers like styrene-butadiene rubber particles and others. These particles may contain solid or liquid chemical blowing agents such as azodicarbonamide, dinitrosopentamethylenetetraamine, bicarbonates, as well as low boiling point ethers, hydrocarbons, and halohydrocarbons such as Freons and the like, for expansion of the particles in the mold on heating to form cellular articles. Other additives such as fillers like glass fibers, asbestos, wood chips and floor mineral wool, carbon and the like, as well as plasticizers, dyes and pigments may be used. Both conductive and non-conductive materials and additives may be used providing only that the amount and nature of the electrically conductive material is not sufficient to cause the electrocharge to leak off the beads too rapidly to prevent charging the mold.

What I claim is:

1. A method of fabricating a shell type article which method comprises:
    electrostatically charging a plurality of thermoplastic resin particles to a predetermined charge potential;
    subsequently bringing at least a portion of the inner wall cavity of a mold into contact with a reservoir of said charged particles whereby a uniform layer of predetermined thickness of the particles is caused to adhere by electrostatic forces to the inner wall of the mold cavity;
    heating the closed mold while said particles are so adhered to expand said particles to form the desired fused shell-type article; and
    cooling and ejecting the finished article from the mold.

2. The method of claim 1 wherein the resin particles containing a blowing agent which on heating causes the formation of a cellular structure in the finished article.

3. The method of claim 1 wherein the resin particles are electrostatically charged in an air fluidized bed.

4. The method of claim 1 wherein the resin particles are expandable polystyrene beads.

5. The method of claim 1 wherein an electrostatic charge of opposite polarity is induced on the inner wall surface of the closed mold cavity and the mold rotated to coat the inner wall surface of the mold cavity with a uniform layer of particles.

6. A method of fabricating thin walled polystyrene containers and the like which method comprises:
   providing a fluidized bed of electrostatically charged polystyrene beads;
   subsequently contacting the charged beads with a metal mold element forming a portion of the inner wall surface of the mold cavity whereby a uniform layer of charged beads is caused to adhere by electrostatic attraction to the mold surface;
   placing the mold element having the adhering resin particles in a closed mold position;
   heating the closed mold while said beads are so adhered to cause expansion and fusion of the charged beads in the mold cavity to form a non-porous thin wall article of uniform density and thickness;
   cooling the mold to a temperature sufficient to inhibit post expansion of the formed article; and
   ejecting the finished article from the mold cavity.

7. The method of claim 6 wherein the mold comprises mold platens and an inner tubular core element and the core is dipped into the bed and uniformly coated with beads.

8. The method of claim 6 wherein the mold element contacted with the charged particles is charged prior to contact with an electrostatic charge of opposite polarity than the charged particles.

9. The method of claim 6 wherein a preselected section of the inner wall surface of the mold element contacted by the charged particles is coated with a thin layer of electrically insulating material to provide articles having selectively thin areas.

References Cited

UNITED STATES PATENTS

| | | | |
|---|---|---|---|
| 2,451,934 | 10/1948 | Evans | 264 |
| 3,187,381 | 6/1965 | Britten | 264—311 |
| 3,222,725 | 12/1965 | Smith | 264—121 |
| 3,278,673 | 10/1966 | Gore | 264—22 |
| 3,309,439 | 3/1967 | Nonweiler | 264—311 |
| 3,278,656 | 10/1966 | Dicks et al. | 264—24 |

JULIUS FROMME, *Primary Examiner.*

JEFFERY R. THURLOW, *Assistant Examiner.*

U.S. Cl. X.R.

264—24, 45